United States Patent
Stumer

(10) Patent No.: US 7,194,078 B2
(45) Date of Patent: Mar. 20, 2007

(54) NETWORK REDIRECTION CONTROL ROUTING

(75) Inventor: Peggy M. Stumer, Boca Raton, FL (US)

(73) Assignee: Siemens Communications, Inc., Boca Raton, FL (US)

(*) Notice: Subject to any disclaimer, the term of this patent is extended or adjusted under 35 U.S.C. 154(b) by 0 days.

(21) Appl. No.: 09/086,294

(22) Filed: May 28, 1998

(65) Prior Publication Data

US 2002/0064271 A1   May 30, 2002

(51) Int. Cl.
H04M 3/42 (2006.01)
H04M 3/54 (2006.01)
H04M 3/58 (2006.01)
H04M 7/00 (2006.01)

(52) U.S. Cl. .................. 379/201.12; 379/211.02; 379/212.01; 379/221.01; 379/221.07

(58) Field of Classification Search ........... 379/210, 379/211, 212, 220, 221, 201.01, 201.02, 201.05, 379/201.12, 211.01, 211.02, 212.01, 219, 379/220.01, 221.01, 221.07, 221.08
See application file for complete search history.

(56) References Cited

U.S. PATENT DOCUMENTS

| | | | |
|---|---|---|---|
| 4,400,587 A * | 8/1983 | Taylor et al. | 379/221 |
| 4,658,416 A | 4/1987 | Tanaka | |
| 4,737,983 A * | 4/1988 | Frauenthal et al. | 379/221 |
| 5,101,451 A * | 3/1992 | Ash et al. | 379/221.07 |
| 5,247,670 A | 9/1993 | Matsunaga | |
| 5,274,700 A | 12/1993 | Gechter et al. | |
| 5,416,834 A * | 5/1995 | Bales et al. | 379/211 |
| 5,432,845 A * | 7/1995 | Burd et al. | 379/210 |
| 5,444,773 A * | 8/1995 | Hirsohn et al. | 379/219 |
| 5,452,349 A | 9/1995 | Uehara et al. | |
| 5,530,931 A * | 6/1996 | Cook-Hellberg et al. | 379/211 |
| 5,555,244 A * | 9/1996 | Gupta et al. | 370/397 |
| 5,590,188 A * | 12/1996 | Crockett | 379/225 |
| 5,617,471 A | 4/1997 | Rogers et al. | |
| 5,668,862 A | 9/1997 | Bannister et al. | |
| 5,790,638 A * | 8/1998 | Bertacchi | 379/211 |
| 5,825,860 A * | 10/1998 | Moharram | 379/112.01 |
| 5,835,583 A * | 11/1998 | Hetz et al. | 379/219 |
| 5,892,819 A * | 4/1999 | Stumer | 379/211 |
| 5,915,008 A * | 6/1999 | Dulman | 370/352 |
| 5,999,610 A * | 12/1999 | Lin et al. | 379/207.02 |

(Continued)

FOREIGN PATENT DOCUMENTS

EP    0 487 811    6/1992

(Continued)

OTHER PUBLICATIONS

Van Gelder, J. et al., "Private Networking with Sopho-TBX and Sopho S Sytems", Philips Telecommunication Review, vol. 43, No. 4, Dec. 1985, pp. 237-252.

Primary Examiner—Harry S. Hong

(57) ABSTRACT

A system and apparatus within a communications server for intercepting supplemental service requests to a communications network and ensuring redirection to correct network party and optimal resource usage when redirecting a call over the network. The optimization system includes a database and database server software. A device/trunk handler is used to interface signalling channels to the optimization system. A monitoring and statistics unit monitors the signalling channels. The server software is responsive to the monitoring and statistics unit and selects the routing of the supplementary service through the appropriate server(s) in the network.

19 Claims, 9 Drawing Sheets

U.S. PATENT DOCUMENTS 6,011,842 A * 1/2000 Brivet et al. ............... 379/207
6,072,866 A * 6/2000 Conan ........................ 379/220
6,075,851 A * 6/2000 Pinard et al. ............... 379/199
6,169,735 B1 * 1/2001 Allen et al. ................. 370/352

FOREIGN PATENT DOCUMENTS

GB          2 299 913          10/1996
WO          WO 97 31493 A      8/1997

* cited by examiner

SERVICE_INDEX_n (e.g., call forwarding, call transfer)
    INTERCEPTOR_TYPE (one value only)
        REJECT (requestor should redirect)
        ACK/ (3rd party to redirect, connection to requestor subsequently released)

BLOCK (absorb the request, no response)
    SCHEDULE (e.g., bit map time-of-day, day-of-year when/when not to intercept)
    RESTRICTIONS (e.g., bit map of exceptions: conditions, users)

FIG. 4

NETWORK REDIRECTION CONTROL ROUTING

BACKGROUND OF THE INVENTION

1. Field of the Invention

The present invention generally relates to a network optimization system and, more particularly, to an optimization system for enabling supplementary service requests to be controlled and routed through the most optimal network resources, particularly when more than one network exists between end users and when the networks are geographically dispersed, such as being located in different countries.

2. Description of the Prior Art

It is well known that modern telephone systems are able to provide a wide variety of convenience features or supplementary services to enhance calling convenience. For example, call redirection is a particular supplementary service typically used by callers and includes specific features such as call diversion and call transfer. Call diversion, also known as call forwarding, provides the caller the ability to program a telephone with a third party's number such that any calls to the forwarding party's telephone number will be automatically forwarded to the third party's number. Call transfer enables either the calling party or the called party to transfer the other party to a third telephone number.

Unfortunately, supplemental services, such as call redirection, do not always make the most efficient use of network resources. Furthermore, some supplementary services may fail or be improperly routed to the wrong destination because they cannot be performed by one or the other user involved in a connection. For example, if a user calls another user who is forwarded to a third party and the forwarding user performs the diversion, the network setup to the forwarded-to user may require more links than necessary. Similarly, if the calling party performs the diversion, the redirection number may be foreign or unknown in the calling party's system or network. This can happen when multiple inter-connected networks have numbering plan conflicts (i.e., duplicate numbers between networks). As such, the diversion will fail or reach the wrong party. Another example of usage occurs when there exists overload/high contention circuits/facilities between one network (or server) and another. There may not be an available circuit/facility for the calling server to make the call to the redirected-to server.

Therefore, what is needed is a system for enabling only the most appropriate and optimal usage of network resources when completing supplemental service redirection requests and for enabling the existing highly contented circuit to be retained and reused for the connection to the redirected-to server to ensure a greater degree of success in reaching the new destination.

SUMMARY OF THE INVENTION

Briefly, the present invention relates to a system and apparatus within a communications system for intercepting supplementary service redirection requests to a communications network and controlling resource for optimizing resource usage when setting up a call over the network. The network services control system is adapted to retrieve server identification data and to write statistical data in order to optimize network resources. A device/trunk handler is used to interface one or more incoming and outgoing signalling channels to the optimization system. A monitoring and statistics unit monitors the signalling channels when a call is made or is in progress. The server software controls the routing of the supplementary service in the network through one or more selected servers. Therefore, in a particular embodiment of the invention, when a predetermined service command is placed to the communications system, the network services control system can selectively intercept the command and reroute the call through the appropriate available servers, thereby ensuring termination to the correct user, reusing hard to get communications facilities and establishing the most optimal route to the call's final destination.

BRIEF DESCRIPTION OF THE DRAWING

Other features, objects and advantages of the present invention will become readily apparent and understood upon consideration of the following detailed description and attached drawings, wherein:

FIG. 4 is a flow chart of a data base access routine used in the optimization system as shown in FIG. 3.

DETAILED DESCRIPTION OF THE INVENTION

The present invention relates to a system for enabling supplementary service functions, such as call redirecting, to be implemented in an interconnected network system using appropriate and available servers and trunk facilities, for optimizing usage. Usage optimization is achieved by enabling any server in the connection to intercept and control the routing of supplementary service functions. Thus, an important aspect of the invention relates to an intervening (i.e., tandem, gateway) server intercepting the supplementary service requests, such as redirect commands, reusing selected trunk facilities, and enabling the network to route the call correctly to the redirected-to party in the network.

Still another important aspect of the invention relates to the selected server redirecting the call to the appropriate server. The optimization system enables the selected server to control the redirection at other servers in the network, regardless of whether the other servers selected for the redirection are involved in the connection. Furthermore, the optimization system is able to suppress any redirection of a call if the network does not support signalling for redirection services or, for other unknown reasons, a particular user must not be redirected.

Figure 1:
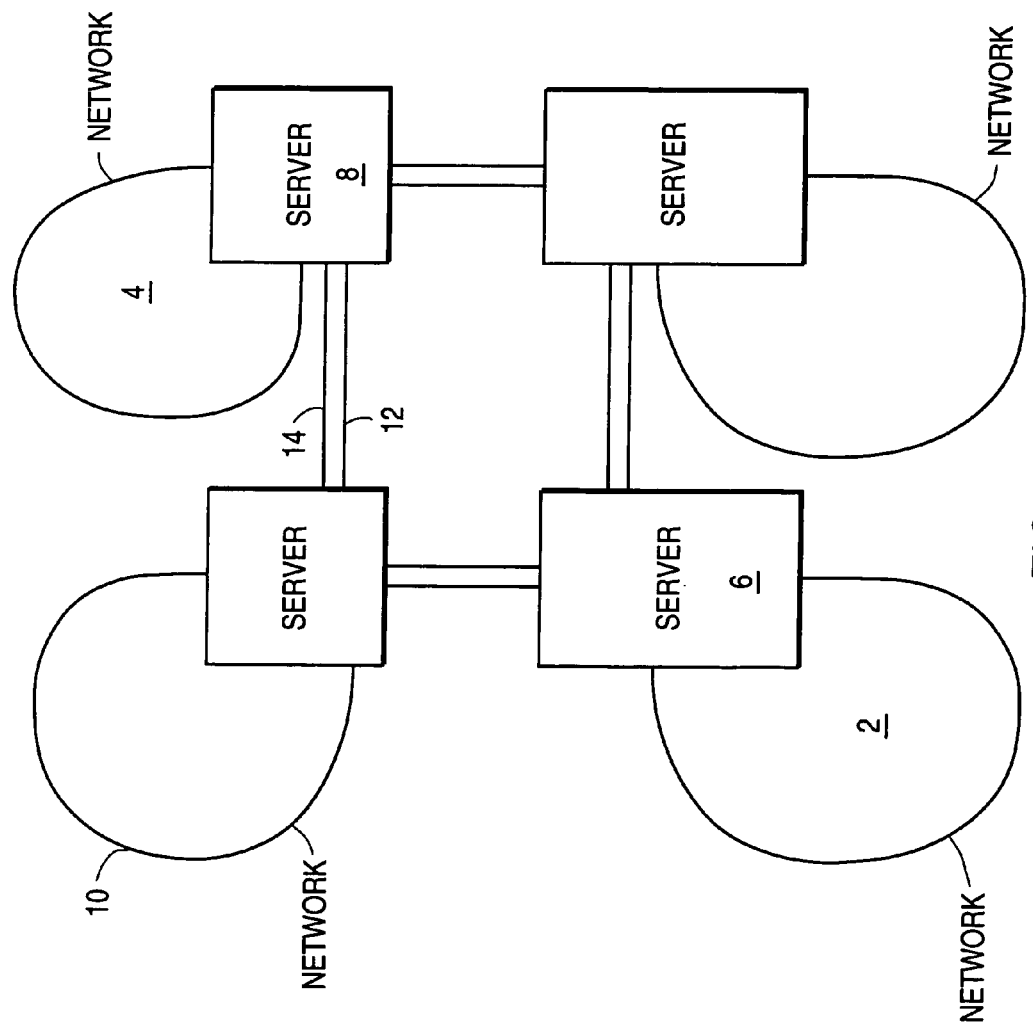
FIG. 1 is a block diagram of a known interconnected communications network.

Referring to FIG. 1, a known interconnected telecommunications network system is shown. As can be seen, several routes are available from the originating network 2 to the destination network 4. Typically, each network also has an associated server 6, 8 that controls network functions. Such a system of interconnected networks sometimes include differing networks which may not be compatible. For example, one network with an ambiguous numbering plan may, under general circumstances, not be able to connect to another network having an ambiguous numbering plan. Therefore, the present invention provides special functionality in the communications system, and in particular the network server 6, 8 to enable incompatible networks to communicate with one another. Furthermore, in those instances where the networks are compatible, the invention ensures that the call is being routed through servers which provide the most optimal route (where optimal is determined by pre-defined data for this network).

Figure 8:
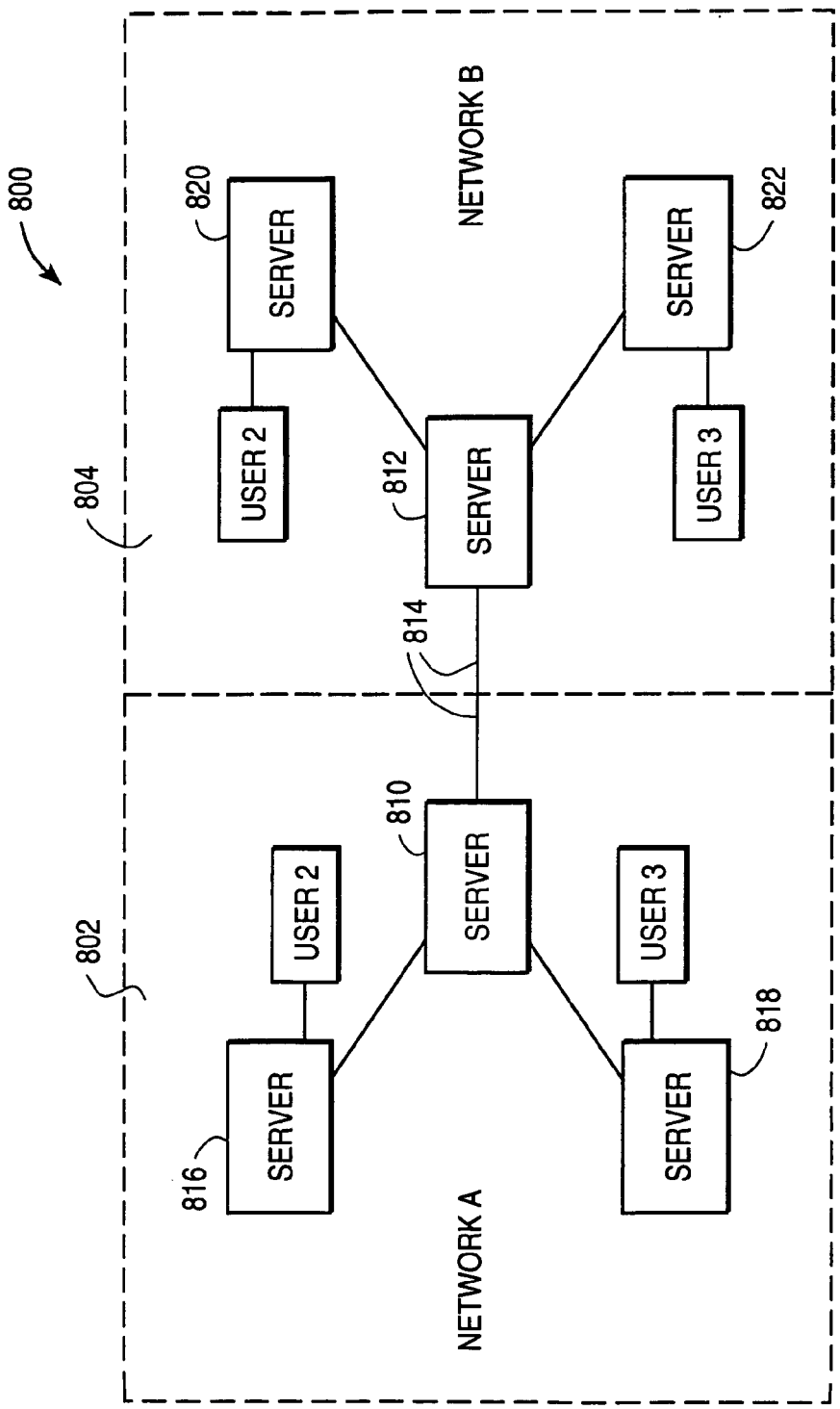
FIG. 8 is a block diagram of a known interconnected communications network having gateway servers.

Still another important aspect of the invention relates to ensuring termination to the correct user and establishing the most optimal route to the call's final destination. Referring to FIG. 8, an interconnected network 800 is shown having gateway servers 810, 812. As illustrated, the interconnecting link 814 represents a physical trunk between the gateway servers 810, 812. For purposes of clarity, the reference numerals for the networks are enclosed within parenthesis in the following discussion.

By way of example only, User 2 in the server 816 in Network A (802) transfers User 2 in the server 820 in Network B (804) to User 3 in the server 818 in Network A (802). User 2 in the server 816 and User 2 in the server 820 have identical network addresses and use a barrier code to dial each other in order for correct routing. If the transfer were to be performed in a known joining type method, also called forward switching, wherein User 2 in the server 816 in Network A (802) would set up the call to User 3 in the server 818 in Network A (802) on behalf of User 2 in the server 820 in Network B (804), five (5) links would be required in the connection. The required links would include: 1) User 2 in the server 820 in Network B (804) to server 812 in Network B (804); 2) Server 812 in Network B (804) to server 810 in Network A (802); 3) Server 810 in Network A (802) to server 816 in Network A (802); 4) Server 816 in Network A (802) to server 810 in Network A (802); and 5) Server 810 in Network A (802) to User 3 in the server 818 in Network A (802).

Similarly, if the transfer were a reroute, also known as throwback, wherein User 2 in the server 820 in Network B (804) sets up the call to User 3 in the server 802 in Network A (802), User 3's address may be duplicated in Network B (804) and the call would be routed in error to User 3 in the server 822 in Network B (804).

In contrast, the present invention enables the redirection to be intercepted and rerouted. For example, server 810 in Network A (802) may perform the setup to server 818 in Network A (802) and clear the link between server 810 and server 816 in Network A (802). This results in using only three links after the redirection is completed. The links include: 1) Server 820 in Network B (804) to server 812 in Network B (804); 2) server 812 in Network B 804 to server 810 in Network A (802); 3) server 810 in Network A (802) to server 818 in Network A (802). This ensures correct routing to the redirected-to party and link optimization at the same time. Furthermore, the present invention can retain and reuse links in the existing connection. For example, the link 814 may be congested, thereby causing network busy conditions. Thus, if the originating server were to perform the redirection, the redirection could fail. In contrast, the present invention enables links (e.g., 814 and backward) to be retained and re-used in the connection to the redirected-to destination.

Figure 2:
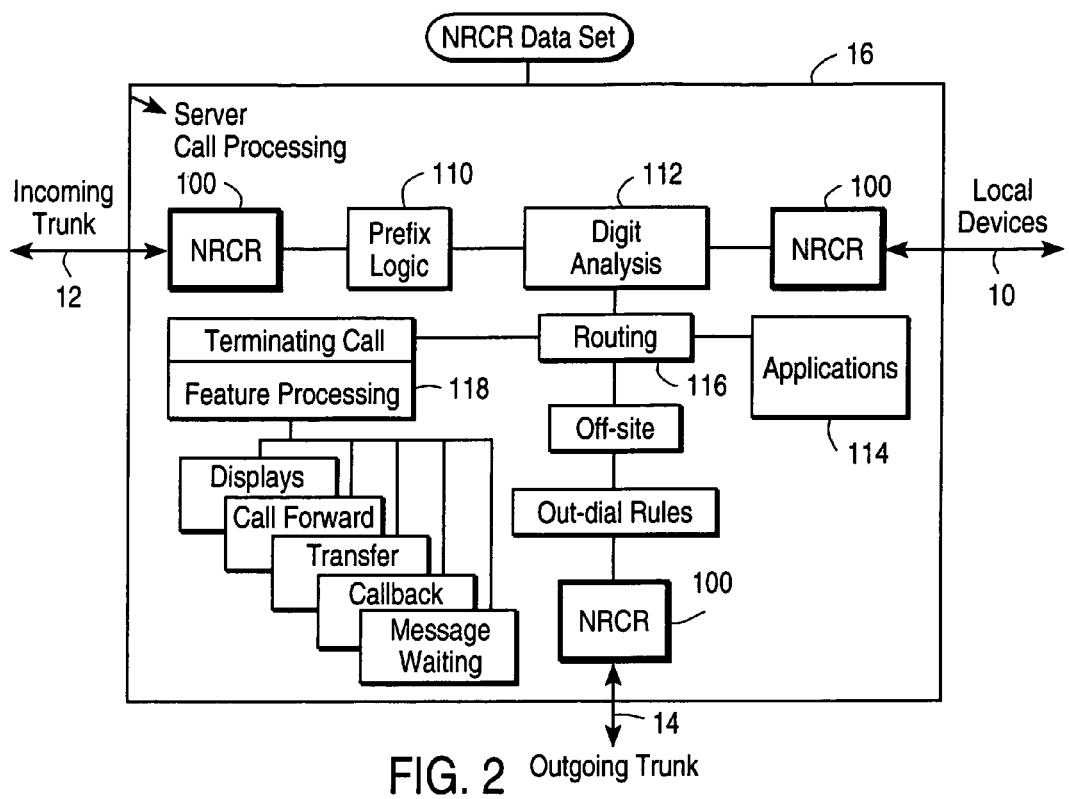
FIG. 2 is a block diagram of a communications server embodying the optimization system in accordance with the present invention.

Referring to FIG. 2, an exemplary embodiment of the optimization system shown as a network services control (NRCR) system in accordance with the present invention, generally identified with the reference 100, is illustrated. Although the NRCR system is shown in a public telecommunication network/exchange (PTN/X) utilizing an integrated services digital network (ISDN), it should be understood by those with ordinary skill in the art that the principles of the present invention are applicable to various interconnected network systems, including asynchronous transfer mode (ATM) networks, local area networks (LANS) and mixed environments having LAN and PTN/X interconnected networks.

In an ISDN type system, as further described below, the servers communicate with one another, and with local devices, generally through external interfaces such as a basic rate interface (BRI) and a primary rate interface (PRI). BRI service, because of the inherent bandwidth limitations imposed by existing copper telephone lines, is typically used for local traffic. PRI is generally used for incoming and outgoing trunk traffic where large amounts of data are carried. Typically, fiber optic lines, for example, are required to handle the extremely large bandwidths of PRI.

As shown in FIG. 2, the NRCR system 100 may be implemented in a communication server 16. The communication server 16, which may be any known communications server, includes standard components such as prefix logic 110 and digit analysis 112 for receiving and evaluating digit strings, applications 114 such as computer telephony interface (CTI) applications, and routing 116 for routing a call to its proper destination. These components are conventional and are not part of the present invention and are therefore not further discussed. The communication server 16 also includes a feature processing module 118 for handling the supplementary services, as discussed above, such as call forwarding and call transfer.

It is to be noted that NRCR systems 100 (multi-processing service), may be installed on both the trunk and line side in a single communication server 16, i.e. devices and/or trunks 10, 12, 14 to which the server 16 interfaces. In particular, an NRCR system 100 can be employed at each point where the server 16 connects to an external interface to enable each communications path to be monitored. Each of the external interfaces 10, 12, 14 to the server 16 generally use bothway traffic flow and hence have their own send 124, 130 and receive 126, 128 paths (FIG. 3) for each path (i.e, send path and receive path). Both way signalling is necessary to enable inter-server communications.

Figure 3:
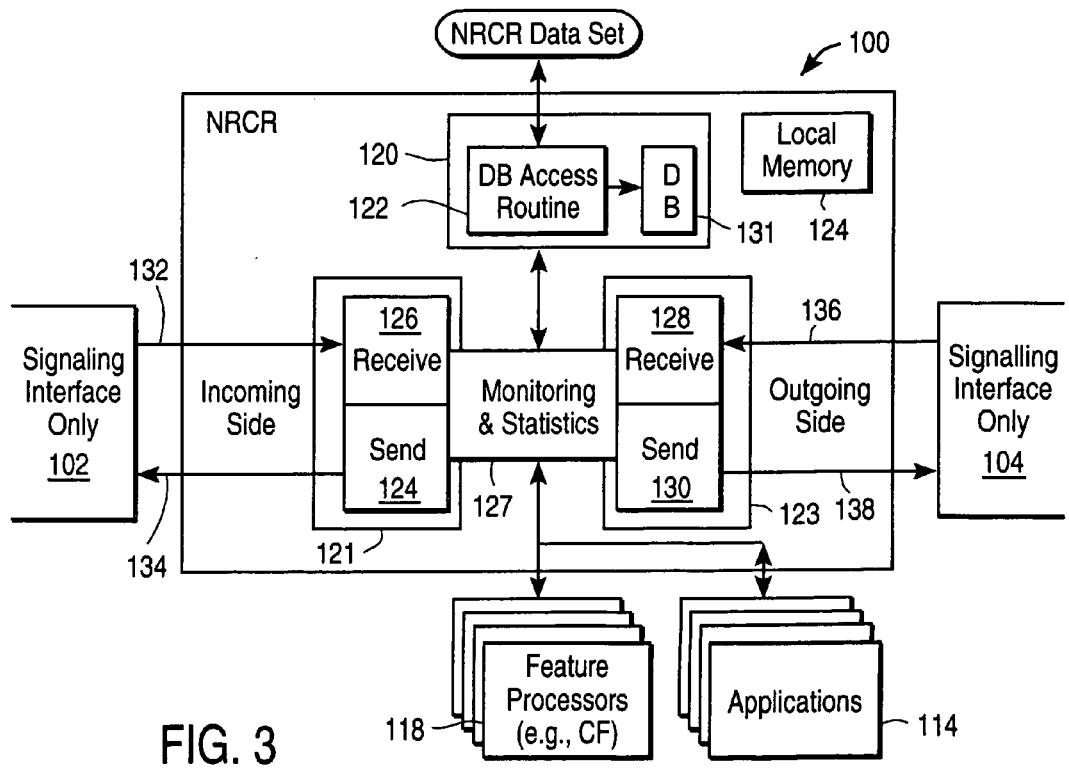
FIG. 3 is a detailed block diagram of the optimization system shown in accordance with the present invention.

Referring to FIG. 3, the NRCR system 100 is shown in greater detail. As mentioned above, the NRCR system 100 is responsible for controlling supplementary communications services, such as call forwarding and call transfer, by intercepting supplemental service requests and ensuring that such services are routed through the most optimal servers available such that best use is made of available resources. The NRCR system 100 includes one or more device/trunk handlers 121, 123 as described below; a monitoring and statistics unit (MSU) 127 for monitoring and decoding signalling channel data; a non-volatile storage unit 120; and a local memory 129 for caching temporary work data. The non-volatile storage device 120 is provided to store a database 131 and database access software 122 to control the access of data for the NRCR system 100.

The incoming trunk 12 (FIG. 2) includes a signalling interface 102, 104 (FIG. 3). It should be understood that the signalling interface 102, 104 may be the same type interface and may be a bothway (i.e., incoming and outgoing) trunk facility, but is shown as two different components as would be true in a tandem and gateway context (i.e., an incoming trunk and outgoing trunk). The present invention is also applicable at a terminating server, which could perform the interception and rerouting. Accordingly, the signalling interface 102, 104 of the external interface 12 has an incoming side and an outgoing side, each of which further includes a send path 134 or 138 and receive path 132 or 136 which interface to the send 124, 130 and receive 126, 128 paths of device/trunk handlers 121, 123. The device/trunk handlers 121 (incoming trunk), 123 (outgoing trunk) interface the server 16 with the BRI and/or PRI external interface 12 and 14 respectively, which contains the signalling channels. Accordingly, an NRCR system 100 may be applied at each point where a server and a PRI and/or BRI connect (FIG. 2). This enables sending and receiving messages to and from the communications servers on each communications interface as used herein. BRI and PRI may be used interchangeably since the invention generally operates by using the D channel and the associated protocols to receive and transmit messages between communications servers. The D channel description is therefore equally applicable to both types of interfaces. The present invention may use only the D channels for all signalling and inter-server communications messages. D channel signalling protocols are specified by the International Telecommunication Union (ITU) Q.930/931 specification. It should be noted that although some form of signalling data may also be carried by the B channels, by using only the D channels for signalling, the B channels generally remain free to carry communications data.

As mentioned above, the device/trunk handlers 121, 123 interface the NRCR system 100 to the PR and BR interfaces connected to the server 16. In particular, the handlers 121, 123 operate as translation devices and are able to support various protocol types. This may be accomplished through a standard message interface between the device/trunk handlers 121, 123 and the PR and BR interfaces.

The MSU 127 interfaces to the device/trunk handlers 121, 123 and monitors and decodes the data carried on the signalling channels of the PR and BR interfaces. In particular, the MSU 127 monitors the incoming receive 132 path and the outgoing receive 136 path for supplemental service related signals as defined in the database access software 122, described in detail below. Furthermore, the MSU 127 may also provide statistical data regarding the operation of the NRCR system for use by network administrators or technicians in gauging network performance and/or diagnosing network related problems. The MSU 127 also interfaces to the feature processing module 118 and applications 114, which provide the particular service operations such as user interface functions, timing and request and response directives.

An important aspect of the invention is the ability of the NRCR system 100 to choose the most optimal servers through which to route calls, based on the type of supplementary service requested. Accordingly, the database 131 may be used to store a list of one or more servers' addresses, listed in order of redirection priority, that are available in the network. The database 131 may also be used as the data source for the database access program 122. Local memory 129 may also be provided to cache or store temporary work data, such as redirect data or database lists, as described in greater detail below.

The database 131, as mentioned above, may be programmed by a network programmer to store a list of available servers that may be used in the redirection operation. The server list is arranged such that those servers that are available for handling the redirect function are listed in order of redirection priority. For example, the most optimal server available may be at the top of the list and the least optimal server may be at the bottom, with the rest of the servers falling somewhere in between. Thus, when the database is accessed, the database access program 122 attempts to select the highest priority server and moves down the list through the lesser priority servers, as required, depending upon the availability of each server.

Referring to FIG. 4, the database set structure with brief description of parameters and values 131 is shown. The database access program 122 accesses the NRCR system 100 data for control and is used to select the particular servers from the database 131 that will be used in routing the calls. In particular, the database 131 includes a SERVICE_INDEX pointer which points to a table element "n" in a data set that identifies the particular services to be monitored by the MSU 127. The SERVICE_INDEX value may be set by the network programmer in order to cause the NRCR system to be activated based on the type of supplemental service requested. For example, the SERVICE_INDEX_n points to a table element that identifies the service to be intercepted e.g., call forward. The particular selected service is identified from the service request data sent over the signalling channels and detected by the MSU in the receive path 126 or 128 (depending on service type). Also included is an NRCR_TYPE variable for executing a particular subroutine based on its value. In particular, the subroutines include REJECT, ACK and BLOCK, as discussed below. The database 131 optionally may also include SCHEDULE data for specifying when the NRCR wakes up or sleeps. Furthermore, RESTRICTION data may optionally also be included to specify, for example, predetermined conditions under which the NRCR system 100 should not be executed or to specify predetermined users that should not have access to features of the NRCR system. Other types of restriction data may also be included.

Figure 7A:
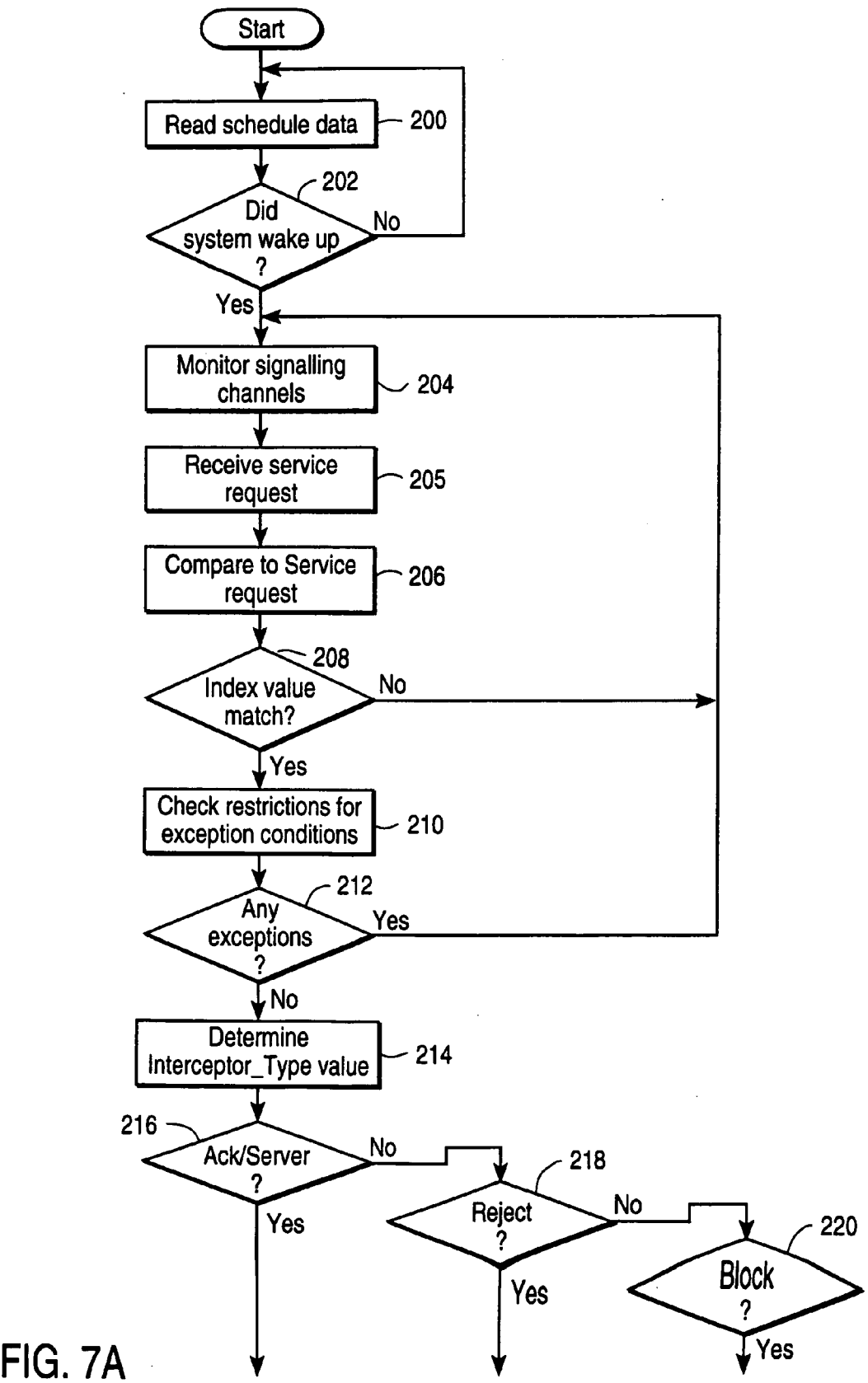
FIG. 7A is a flow chart of the data base access routine in operation.

Referring to FIG. 7A, in operation, therefore, the database access program 122 in step 200 causes the NRCR system 100 to wake up or sleep based, for example, on the SCHEDULE subroutine. The mechanism for waking and sleeping is implementation-dependent. When awake in step 202, the NRCR system 100 monitors the signalling channels 102 and 104 for service requests in step 204. Each time a service request is detected in step 205 it is compared to a predetermined SERVICE_INDEX value in step 206, which indicates the particular supplementary service being requested. If the service request matches the SERVICE_INDEX in step 208, the NRCR system checks the restrictions data in step 210 for exception conditions as to when not to apply the NRCR system functions. In step 212, if no exceptions apply, then in step 214 the NRCR_TYPE value is determined. In steps 216, 218, 220, as discussed further below, subroutines dependent on the NRCR_TYPE variable are executed, such as REJECT, ACK and BLOCK, respectively. The service request also includes associated redirect data needed to redirect the call, such as the redirection number, redirecting number and redirected number. As mentioned above, the redirect data is stored in the memory register 129. If no redirect data is provided, the redirection will fail.

Once it has been determined that the service request matches the SERVICE_INDEX, the NRCR_TYPE variable, as mentioned above, may be set to one of the three possible values.

Figure 5:
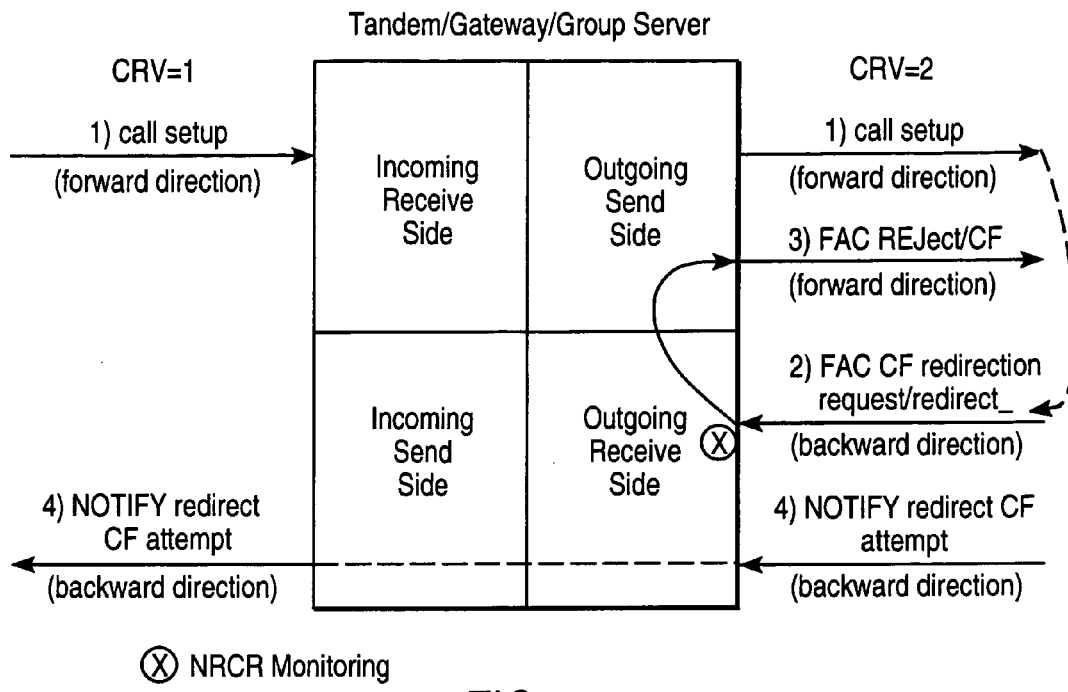
FIG. 5 is a block diagram showing the handling of a call forward redirection in accordance with the present invention.

In particular, referring to FIG. 5, an example of signalling information where NRCR_TYPE equals REJECT for a call forwarding (CF) redirection situation is shown. The REJECT subroutine is executed in those cases where a particular server cannot service the redirection request and the requestor should redirect the call. Typically, during CF redirection, the forwarding party enters a different telephone number at which all or specific calls intended for the forwarding party are automatically sent to the forwarded number. Thus, when a calling party originates a call to the forwarding party, the call will be completed at the forwarded number. However, in certain instances, an intervening server may not be able to handle the CF function request. For example, this may occur in a situation where a server does not support the particular type of that redirection service being requested or where signalling channel information cannot be sent to a server. In that case, an alternate server must be used through which the call may be routed. Accordingly, the example shown in FIG. 5 describes the situation wherein terminating server (i.e., forwarding user's server) executes the CF routing function to the forwarded number rather than the intervening or originating server. The intervening server rejects the facility request on behalf of the originating server. Upon the forwarding server receiving the reject, it shall attempt to forward-switch the call.

In particular, the NRCR system 100 is applied at the server 16 on the outgoing side of a signalling channel for a call forward (CF) redirection service. Therefore, the MSU 127 monitors and decodes the signals on the outgoing receive side of the server since the service requestor is on the CRV=2 side of the call (CRV=n is an ISDN call reference value identifier associated with the call).

In step 1, a call setup message is transmitted over the signalling channel to the incoming receive side of the intervening server. The call setup message is then sent to the forwarded number's server. In step 2, the server at the forwarded number, in response to the call setup message, returns a CF redirection request along with redirect data toward the originating party's server. In this case, since the intervening server database is predefined with a reject response in step 3 a return REJECT response is sent to the forwarded number server notifying it that the intervening and originating server cannot perform the CF redirection. In step 4, the service requester has received the reject and performs a forward-switching function to forward the call on behalf of the originating server and then sends a message to the caller with notification of call forward.

Figure 7B:
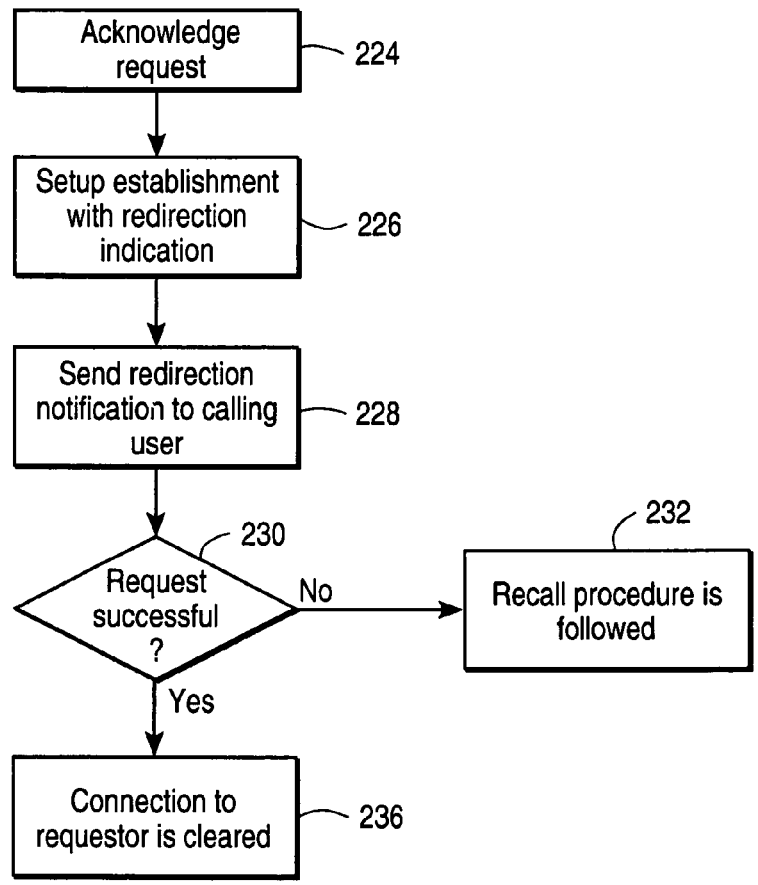
FIG. 7B is a flow chart of the Acknowledge/Server subroutine of the database access routine.
Figure 7C:
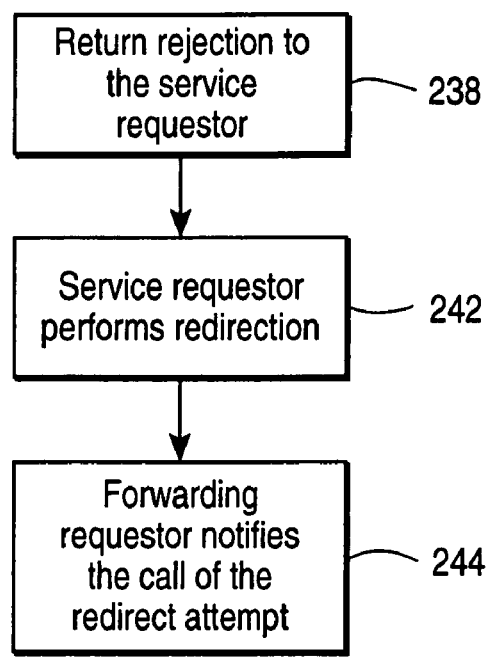
FIG. 7C is a flow chart of the Reject subroutine of the database access routine.

In operation therefore, referring to FIG. 7C, when the REJECT subroutine is executed, the NRCR system will return notification of the rejection to the service requestor in step 238. Typically, once the service requester receives notification of the rejection, it will perform the redirection itself on behalf of the user to be redirected in step 242. In step 244, the call is notified of the CF attempt.

Figure 6:
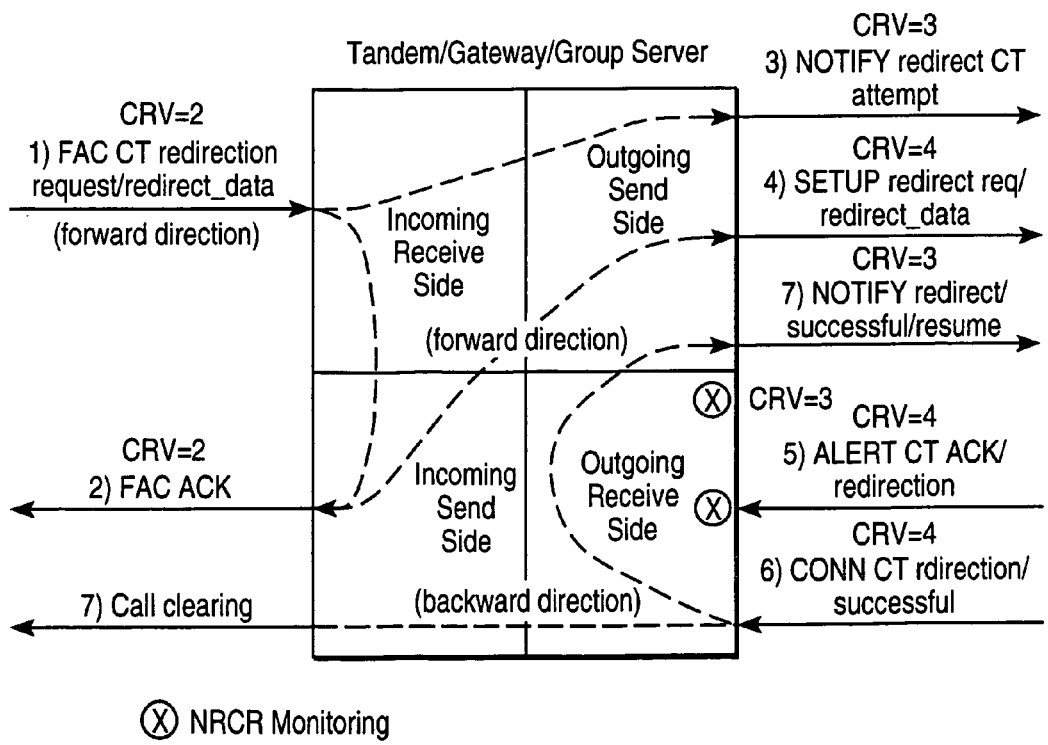
FIG. 6 is a block diagram showing the handling of a call transfer redirection in accordance with the present invention.

Referring to FIG. 6, an example of signalling information where NRCR_TYPE equals ACK is shown for a call transfer (CT) redirection situation. The ACK subroutine is executed when the intervening server, i.e., a third party, is available to handle a redirection request. Typically, during CT redirection, either the calling or the called party may transfer the other party to a third number. Therefore, in this particular example, it is shown that the intervening server is indeed able to handle the CT redirection. Accordingly, the example shown in FIG. 6 describes the situation wherein the intervening server executes the CT routing function to the transferred number.

In particular, the NRCR system 100 applies at a server on the incoming receive side and outgoing receive side of a signalling channel for CT redirection service. Monitoring of the signalling channels by the MSU 127 takes place at both sides of the server since either user might invoke the CT service. In this example, in step 1, the service requestor is on the CRV=2 side of the call and the NRCR_TYPE is ACK. This NRCR_TYPE results in execution of step 2, wherein a response is sent to the service requestor with positive ACK. In step 3, a CT redirect notification is sent to a remote server. It should be noted that the order of steps 2 and 3 may be reversed.

In step 4, a connection to the redirected-to user is established with indication that this is a redirected call and, optionally, the redirecting and calling user's identification information. After receiving an alert message (i.e., redirection success) from the outgoing receive side in step 5, the connection to the redirecting user is released and the timer is stopped. The caller is switched to the timeslot of the redirected-to party. The redirection is successful and the transaction (i.e., redirection) is considered complete. Step 6 shows the call was answered. The memory 129 is also reinitialized to erase the redirect data. It is to be noted that if the NRCR system 100 redirection fails (e.g., network congestion, DISConnect received) for some reason, the NRCR system 100 will recall the transferring user. In particular, a timer (t1) which may be an internal software timer of a pre-determined time interval, is started at the time of responding to the redirecting requester, i.e. the incoming send side. The connection is not disconnected at this time, it is retained until the redirect is successful, if not successful, recall occurs. If the redirection has not been successful at timer expiry (t), the redirecting requester is recalled.

In operation therefore, referring to FIG. 7B, when an ACK subroutine is executed, the system absorbs the service request in step 222 and acknowledges the service request in step 224. In step 226, the intervening server sends a setup with redirection notify to the redirected-to server. In step 228, the calling user is notified of the redirection. In step 230, the system determines whether the setup was successful i.e., ALERT or CONNect message is received. If so, then the channels are switched together and in step 236 the connection to the requestor is cleared. If the redirect request was not successful, then in step 232 a recall message is sent to the requester.

When the NRCR_TYPE equals BLOCK, the signalling channel is monitored for the associated SERVICE_INDEX. If a redirection request is detected, the message is absorbed and no response is returned to the sender nor is any notification provided by the NRCR system 100 to the party being redirected. The sender of the redirection request's guard timer will elapse and exception handling will follow. This NRCR_TYPE is typically used when the user to be redirected is in a network which does not support the signalling for redirection services and may not support notification signalling either.

Figure 7D:
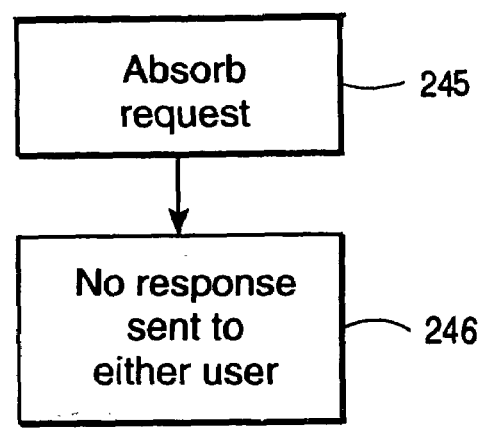
FIG. 7D is a flow chart of the Block subroutine of the database access routine.

In operation, referring to FIG. 7D, the BLOCK subroutine is executed in those instances when no redirection is allowed or possible. Thus, when the BLOCK subroutine is executed, in step 245 the system absorbs any message which could result in a redirection failure, or other event, depending on how the service requestor handles a no response, and in step 246 takes no further action.

Optionally, the database access program may also include a SCHEDULE subroutine for enabling the NRCR system to wake up or sleep, based on, for example, the time of day, day-of-year etc., trunk costs, priority or other parameters specifying when or when not to start. Furthermore, the database access program may also include an optional RESTRICTION subroutine for determining exception conditions as to when the control system should not execute.

As an option, the NRCR system 100 may be implemented, using the MSU 127, to collect and store redirection statistics such as number of REJECT intercepts, ACK intercepts and BLOCK intercepts, number of redirection failures etc., for use by the network and/or the system administrator.

Thus, it can be seen that present invention prevents failure of redirection services in those instances where one or more servers are not able to handle particular service requests and ensures that only the most optimal servers are used in performing many of the redirection functions. In addition, the invention provides the ability to optionally condition execution of supplementary service requests based on a variety of user selectable criteria.

What is claimed is:

1. A time-division multiplexing (TDM) communications network resource usage control system, comprising:
   a plurality of servers in the TDM communications network adapted to execute supplementary communications service requests;
   a network services control system (NRCR) connected to each external interface of said plurality of servers to receive and decode supplementary service information for the supplementary communications service being requested; and
   a control program responsive to said NRCR to select which of said plurality of servers will execute said communications services;
   wherein an NRCR at at least one of said plurality of servers in a communication path of said supplementary service communications request is adapted to intercept a supplementary communications service request to determine whether execution of said supplementary communications service request is carried out by a server other than an original requested server, perform a link optimization based on a type of supplementary service being requested and redirect said supplementary service communications request to said other server over the TDM communications network.

2. The system as recited in claim 1, wherein said supplementary communications services include redirection services.

3. The system as recited in claim 2, wherein said redirection services includes call forwarding.

4. The system as recited in claim 2, wherein said redirection services include call transfer.

5. A communications network resource usage optimization system in an interconnected TDM network system, comprising:
   a plurality of servers in the interconnected TDM network system adapted to execute supplementary communications service requests;
   a network services control system (NRCR) connected to each external interface of said plurality of servers to receive and decode supplementary service information for the supplementary communications services being requested; and
   a control program responsive to said NRCR decoding supplementary service information adapted to perform a link optimization based on a type of supplementary service being requested and select which of said plurality of servers will execute said communications services, said control program further enabling said optimization system only under predetermined conditions;
   wherein at least one of said plurality of servers in a communication path of a supplementary communications service request comprises an intervening server and is adapted to intercept a supplementary communications service request to determine whether execution of said supplementary communications service request is carried out by a server other than an original requested server and redirect said supplementary service communications request to said other server over the interconnected TDM network system;
   wherein an optimization comprises re-using a predetermined number of links in an original connection.

6. The system as recited in claim 5, wherein said control program further includes means for disabling said optimization system under predetermined conditions.

7. The system as recited in claim 6, wherein said disabling means is responsive to a recall mechanism for failed service requests.

8. The system as recited in claim 5, wherein said optimization system includes means for customizing one or more operating parameters of said optimization system.

9. A method for controlling communications network resource usage in a TDM communications network, comprising:
   enabling supplementary communications service requests;
   intercepting said supplementary communications service requests at an intervening server before execution by a destination server, said intervening server including a network services control system (NRCR) at each communication interface;
   receiving and decoding supplementary service information for said supplementary communications service being requested at an intercepting NRCR;
   performing a link optimization at said intercepting NRCR based on a type of supplementary service being requested and selecting which of said one or more servers will execute said communications services; and
   redirecting said supplementary service communications request to said selected server over the TDM communications network.

10. The method of claim 9, further including the step of enabling said selecting step under predetermined conditions.

11. The method of claim 9, further including the step of disabling said selecting step under predetermined conditions.

12. The method of claim 9, further including the step of customizing one or more operating parameters of the communications controlling method.

13. A telecommunications server in a TDM communications network, comprising:
   a feature processing module for handling supplemental services; and
   a network services control system for supervising handling of said supplemental services, and adapted to interface to each trunk coupled to said server; said network services control system including
   one or more device/trunk handlers;
   a monitoring and statistics unit for monitoring said one or more device/trunk handlers for supplementary service signals;

a database system adapted to store a list of one or more servers' addresses, listed in order of redirection priority, that are available in the TDM communications network;

wherein said network services control system is adapted to intercept and redirect supplementary service functions for handling to another server over the TDM communications network and said monitoring and statistics unit is adapted to access said database when a supplementary service signal is detected and, depending on a corresponding entry in said database, acknowledge, reject or block the corresponding supplementary service, said network services control system being in a path of a supplementary service function being requested.

14. A telecommunications server as recited in claim 13, further including a database access program including a schedule routine for waking said network services control system according to predetermined criteria.

15. A telecommunications server as recited in claim 13, wherein said database includes a service index pointer identifying a type of service being requested.

16. A telecommunications server as recited in claim 14, said predetermined criteria including at least one of time of day, trunk costs, or priority.

17. A telecommunications server as recited in claim 16, said network services control system adapted to redirect a supplemental service request to another server based on a type of service being requested.

18. A telecommunications server as recited in claim 13, further including a network services control system coupled at every server interface.

19. A telecommunications server as recited in claim 13, wherein said a network services control system is coupled at a connection of a primary rate interface or a basic rate interface.

* * * * *